United States Patent Office 3,547,856
Patented Dec. 15, 1970

3,547,856
FLUORINATED OIL AND WATER REPELLENTS
Thomas K. Tandy, Jr., Newark, Del., assignor to E. I. du Pont de Nemours and Company, Wilmington, Del., a corporation of Delaware
No Drawing. Filed Mar. 11, 1969, Ser. No. 806,303
Int. Cl. C08f 15/26
U.S. Cl. 260—80.81   21 Claims

ABSTRACT OF THE DISCLOSURE

Fluorinated oil and water repellent polymers containing units derived from monomers having the structures $R_fCH_2CH_2O_2CCH=CH_2$ wherein $R_f$ is a perfluoroalkyl group of 4 through 14 carbon atoms, and $RO_2CCH=CH_2$ wherein R is $F(CF_2)_n$—$CH_2$— where $n$ is 1 or 2, $HCF_2CR_2CH_2$—, or $(CF_3)_2CH$, and optionally containing small amounts of units derived from monomers selected from $CH_2=CR^1$—$CONH$—$R^2OH$, $CH=CR^1CO_2R^3OH$, $CH_2=CR^1CO_2R^4$, and mixtures thereof wherein $R^1$ is H or $CH_3$, $R^2$ is an alkylene group of about $C_{1-4}$, $R^3$ is an alkylene group of about $C_{2-4}$, and $R^4$ is an epoxyalkyl group of about $C_{3-4}$.

BACKGROUND OF THE INVENTION

Field of the invention

The invention relates to novel fluorinated polymers containing $F(CF_2)_nCH_2CH_2O_2CCH=CH_2$ and $$RO_2CCH=CH_2$$

especially trifluoroethyl acrylate, which are useful in treating textile fabrics to render said fabrics oil and water repellent.

Description of the prior art

While a variety of art known fluorine containing polymeric materials presently used in the treatment of textile fabrics are capable of effecting oil and water repellency in said fabrics, there are still several extant problems in the area of repellency which are not overcome by known oil and water repellent fluorinated polymers.

One such problem is repellency protection of a permanent press fabric prior to curing. The resins utilized in permanent press systems require high temperature cures which cannot be applied until after the textile fabric is converted into final garment form and the desired creases applied. Since the known fluorinated polymeric oil and water repellent materials cannot be cured to afford water and oil repellency protection until after the garment is complete leaving them subject to oil and grease staining during manufacture.

Another such problem is the loss of the oil and water repellent coatings by the fabric as a result of abrasion. Rubbing during flexure or laundering, sliding of two fabrics together as in the case of upholstery and numerous other types of movement all tend to abrade the surfaces of fibers in a fabric. Many of the art known fluorinated oil and water repellent polymeric materials display an unsatisfactory resistance to abrasion and consequently the fabrics treated with these materials tend to lose the protective coating of oil and water repellent, especially at points of greatest wear. As a result of this loss there is an attendant loss of repellency to soiling by oil and water based materials at these same points.

Novel fluorinated polymers have now been discovered which, when used in treating textile fabrics, display unexpected properties and qualities such as an ability to effect water and oil repellency in permanent press systems prior to curing, and a resistance to abrasion and consequent loss of repellency, thus overcoming some of the outstanding problems in the area of oil and water repellency which exist for garment manufacturers and the like.

SUMMARY OF THE INVENTION

The present invention is directed to oil and water repellent polymers. These polymers contain about 75 to 98 weight percent of units derived from monomers having the structure $R_fCH_2CH_2O_2CCH=CH_2$ where $R_f$ is a perfluoroalkyl group of about $C_{4-14}$, about 25 to 2 weight percent of units derived from monomers having the structure $RO_2CCH=CH_2$ where R is selected from $F(CF_2)_nCH_2$— wherein $n$ is the integer 1 or 2, $HCF_2CF_2CH_2$—, and $(CF_3)_2CH$.

It is also often desirable to add a monomer selected from $CH_2=CR^1CONH$—$R^2OH$,
$CH_2=CR^1CO_2R^3OH$,
$CH_2=CR^1CO_2R^4$, and mixtures thereof, wherein $R^1$ is H or $CH_3$, $R^2$ is an alkylene group of about $C_{1-4}$, $R^3$ is an alkylene group of about $C_{2-4}$ and $R^4$ is an epoxyalkyl group of about $C_{3-4}$. The amount of units derived from these monomers which will be used may vary from 0 to 5 weight percent.

The total weight percent of monomer derived units present in the copolymer is 100% and said copolymer having preferably an inherent viscosity as a 0.5% solution in trichlorotrifluoroethane at 30° C. of less than 0.8.

DESCRIPTION OF THE INVENTION

These new fluorinated polymers contain two essential ingredients. The first is a monomer having the structure $R_fCH_2CH_2O_2CCH=CH_2$ wherein $R_f$ is a perfluoroalkyl group of from four to fourteen carbons. From 75% to 98% by weight of units derived from such monomers must be present in the polymer.

In these monomers $R_fCH_2CH_2O_2CCH=CH_2$, the perfluoroalkyl group $R_f$ is preferably a straight chain group $F(CF_2)_s$ where $s$ is from 4 to 14 and more preferably a mixture of these groups where $s$ is predominantly 6, 8 and 10, since these groups are commercially available, financially practical and give the best results. Branched perfluoroalkyl groups such as $(CF_3)_2CF(CF_2)_{s'}$, where $s'$ is from one to 11 may however also be utilized.

The monomers $R_fCH_2CH_2O_2CCH=CH_2$ may be prepared by esterifying the alcohols $R_fCH_2CH_2OH$ by one of several art known means such as reaction with acrylyl chloride in the presence of a tertiary amine; reaction with acrylic acid in the presence of either an acid catalyst such as sulfuric or toluenesulfonic acids or a tetraalkyl titanate (Werber, U.S. Pat. 3,056,818); reaction of the iodides $R_fCH_2CH_2I$ with an alkali metal salt of acrylic acid, using the procedure of Fasick, U.S. Pat. 3,239,557; or transesterification of the alcohols $R_fCH_2CH_2OH$ with an alkyl acrylate such as the methyl or ethyl esters in the presence of an acid or a tetraalkyl titanate (Haslam, U.S. Pat. 2,822,348). The alcohols $R_fCH_2CH_2OH$ are art known compounds, see for example Day, U.S. Pat. 3,283,012.

Only the acrylic acid ester monomers $$R_fCH_2CH_2O_2CCH=CH_2$$

should be used in this invention since the corresponding methacrylic acid esters $R_fCH_2CH_2O_2CC(CH_3)=CH_2$ do not give the desired results. Additionally, the acrylic acid esters must also have the two methylene groups between $R_f$ and the ester carbonyl group, for when either of the known groups of acrylic acid esters $R_fCH_2O_2CCH=CH_2$ (U.S. Pat. 2,642,416) or $R_f(CH_2)_pO_2CCH=CH_2$, $p=3$ or more (U.S. Pat. 3,102,103) are substituted for the monomers $R_fCH_2CH_2O_2CCH=CH_2$, the desired results are again not obtained.

The second essential monomer in the present polymers are the acrylate esters $RO_2CCH=CH_2$ where R is selected from $F(CF_2)_nCH_2—$, $n=1–2$, $HCF_2CF_2CH_2—$, and $(CF_3)_2CH—$. It should be noted that these are all acrylates, and that the corresponding methacrylate esters are not useful in this invention.

These acrylate esters are all readily available by esterification or transesterification of the corresponding alcohols $F(CF_2)_nCH_2OH$ with acrylic acid or simple esters thereof. The esters $F(CF_2)_nCH_2O_2CCH=CH_2$, $n=1$ and 2 are known compounds, [Codding et al., J. Polym. Science, 15, 515 (1955)]. The ester

is readily prepared by the method of Bittles, U.S. Pat. 2,628,958, and the monomer $(CF_3)_2CHO_2CCH=CH_2$ is known. (See Hollander and Woolf, U.S. Pat. 3,177,185.)

It is essential in the present invention that at least 2 weight percent of units derived from this monomer and no more than 25 weight percent be present. If less than 2% or more than 25% of units of such monomers are present, the desired properties of the polymers are no longer obtained.

Of the monomers $RO_2CCH=CH_2$ described above, the preferred species are $CF_3CH_2O_2CCH=CH_2$ and

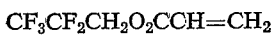

and the preferred concentrations are in the range of about 3 to 10% by weight $RO_2CCH=CH_2$.

It is often desirable though not essential to include in the polymers of this invention small amounts of units derived from certain monomers which can lead to greater durability to dry-cleaning and laundering. While satisfactory durability exists absent these monomers, a still more durable product may result when they are present. These monomers are chosen from N-hyroxyalkyl acrylamides of structure $CH_2=CR^1—CONH—R^2—OH$, hydroxyalkyl acrylic esters of structure $CH_2=CR^1—CO_2R^3OH$ or epoxyalkyl acrylic esters of structure $CH_2=CR^1CO_2R^4$ where $R^1$ is H or $CH_3$, $R^2$ in the amides is hydroxyalkyl of about one to four carbons, $R^3$ in the esters is hydroxyalkyl of about two to four carbons and $R^4$ is an epoxyalkyl of about 3 to 4 carbons. Some of these monomers which are commercially available are N-methylol acrylamide, N-methylol methacrylamide, 2-hydroxyethyl acrylate, 2-hydroxyethyl methacrylate, glycidyl acrylate and glycidyl methacrylate. The other hydroxyalkylamides are readily available by reaction of acryloyl or methacryloyl chloride with hydroxyalkylamides such as ethanolamine, 2-hydroxypropylamine, 3-hydroxypropylamine, 2-hydroxybutylamine, 3-hydroxybutylamine or 4-hydroxybutylamine. Other hydroxyalkyl acrylates or methacrylates are available by esterification of one mole of acrylic or methacrylic acid with one mole of diols such as 1,2-propylene diol, 1,3-propylene diol, 1,2-butylene diol, 1,3-butylene diol or 1,4-butylene diol. Other epoxyalkyl esters are available from the epoxy butanols.

Of these monomers, commercially available monomers such as N-methylol acrylamide or methacrylamide, 2-hydroxyethyl acrylate or methacrylate and glycidyl acrylate or methacrylate are preferred. Mixtures of two or more of the monomers described above may be used and, in some cases are preferred, for example equal weights of N-methylol acrylamide and 2-hydroxyethyl methacrylate. The use of more than 5 weight percent of units derived from such monomers in the present invention produces undesirable effects on the polymer properties and consequently from about 0 to 5 weight percent is untilized. About 0.5% by weight or such units is preferred when they are employed, although as little as 0.1% may be used.

No significant amounts of monomers other than the aforementioned three types should be present in the polymers of this invention or the desirable properties will be lost.

Although the polymers of this invention may be prepared by solution polymerization techniques well known in the art, it is preferred to use aqueous emulsion techniques. In the broadest sense, any known free radical initiator may be used, including both water soluble and water insoluble types. Among the water soluble types are inorganic peroxides such as sodium peroxide, barium peroxide, ammonium or potassium persulfate and water soluble azo compounds such as azobis (isobutyr amidine) dihydrochloride. Among the water insoluble types are peroxy anhydrides such as benzoyl peroxide, peroxy esters such as tert-butyl peroxy pivalate, tert-butyl peroxy benzoate, hydroperoxides such as tert-butyl hydroperoxide, ditertiary alkyl peroxides such as ditert-butyl peroxide, and water insoluble azo compounds such as azobis (isobutyronitrile), azobis (dimethylvaleronitrile) and the like. Redox initiators such as the combination of ammonium persulfate, sodium bisulfite and ferrous sulfate are also useful.

In general, the water soluble initiator azobis (isobutyramidine) dihydrochloride is the initiator of choice since it generally results in a more uniform polymer.

The polymerization temperature is chosen to suit the initiator being used and the temperatures appropriate to each of the aforementioned initiator types is known to those skilled in the art.

The polymerization is carried out by first emulsifying the monomers in water, then bringing the reaction mass to the desired temperature and adding the initiator. It may be desirable, although not essential, to homogenize the monomer-water mixture before heating. Since some of the monomers $RO_2CCH=CH_2$ defined earlier are relatively low boiling compounds, often lower boiling than the desired polymerization temperature, provision should be made to restain these monomers in the reaction system. This is readily accomplished by use of either an efficient reflux condenser on the reaction vessel or by using a sealed autoclave for the polymerization.

Emulsifying agents must, of course, be used to obtain aqueous emulsions. Either cationic or anionic types are more preferred than nonionic types and mixtures of nonionics with either other type may be used. Useful cationic types are the well-known quaternary ammonium salts of long chain fatty amines, $[R^5NR_3^6]^+X^-$ where $R^5$ is an alkyl group of at least twelve carbons. In general, $R^6$ is a lower alkyl group such as methyl and $X^-$ is an inert anion such as chloride ion. A typical group of such emulsifying agents is the ammonium salts sold by the Armour Co. under the trade name "Arquad." These are n-alkyl trimethyl ammonium chlorides where the alkyl has from 12 to 18 carbons with 16 being preferred. These are the preferred cationic emulsifying agents. Another type of cationic agents is the acetate salts of n-alkyl dimethylamines where alkyl again contains 12 to 18 carbons. These salts are suitable insofar as the polymerizations are concerned but have a slight deleterious effect on oily-soil washability of the product polymers on fabric, hence are not preferred.

Useful anionic emulsifying agents include both the alkali metal salts of alkanesulfonic acids and alkali metal salts of monoalkylsulfuric acid esters, where alkyl again is from 12 to 18 carbons. Fatty acid soaps may be used, provided the fatty acid is relatively free of unsaturated acids.

It is generally preferable, if the most advantageous polymer properties are to be obtained, that the inherent viscosities of the polymers of this invention be below 0.8, when measured at 30° C. as 0.5% solutions in trichlorotrifluoroethane. Inherent viscosity is determined by the formula $$Vi = \frac{1}{C}\ln\left[\frac{V}{Vo}\right]$$

where $Vi$ is the inherent viscosity, C is the polymer concentration in grams per 100 ml. of solution, V is the viscosity of the solution, $Vo$ is the viscosity of the solvent and ln is the natural logarithm.

If necessary, small amounts of chain transfer agents such as dodecyl mercaptan may be added to control molecular weight and hence inherent viscosity. In the most preferred situation, inherent viscosity of the polymers will be in the range of 0.1 to 0.35. Chain transfer agents are usually needed to obtain this range of viscosities.

For use in oil and water repellent formulation, the polymer emulsions obtained by the above procedures are usually used directly in the pad bath without isolation of the polymer.

The compositions are applied to the textile fabric preferably as an aqueous dispersion by brushing, dipping, spraying, padding, roll-coating or by any combination of these methods. For example, the prepared concentrated dispersion of polymer composition may be used as a pad bath by diluting it with water to a solids content of 0.1% to 10% by weight of the bath. The textile material is padded in this bath, and is then freed of excess liquid, usually by squeeze rolls, so that the dry pickup (weight of dry polymer on fiber) is between 0.1% and 10% by weight of the fiber. The treated material is then dried by heating, say in an oven at 135° to 172° C. until dry. The dry fabric is oil and water repellent without further heating but such further heating may increase the degree of repellency somewhat. The textile material will retain repellency even after many launderings or dry-cleanings.

It is common practice to treat fabrics with several agents at the same time. These agents may include softeners, crease resistance agents, wetting agents, antistatic agents, resin finishes, soil release agents and the like. When used in the presence of such agents, concentrations of the polymers of this invention lower than those required when used may be required to obtain equivalent repellency. It is also common practice to add auxiliary water repellents to treating baths. In general, far more of the polymers of this invention are required to obtain maximum water repellency than maximum oil repellency. Commercially, it is cheaper to add only as much polymer as is required to obtain the desired oil repellency than to add the far cheaper water repellents to bring up water repellency to the desired level.

More recently, another development has occurred in the textile trade, the permanent press treatment, as taught, for example, in U.S. Patent 2,974,432. In this treatment, a permanent press resin such as

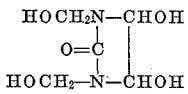

described in U.S. Patent 3,049,446 is coapplied along with the polymers of this invention. In some cases such resins are not cured, however, until the textile is fabricated into the finished article. It is important, therefore, that the textile is repellent, without anything more than drying, which occurs when using the polymers of this invention, as above indicated.

Suitable substrates for application of the polymers of this invention are fibers, yarns, fabrics and articles made of filaments, fibers or yarns derived from natural, modified natural or synthetic polymeric materials or from blends of these. Examples ae cotton, silk, regenerated cellulose, nylon and like synthetic polyamides, fiber-forming linear polyesters, fiber-forming polyacrylonitrile and modified acrylonitrile polymers, cellulose nitrate, cellulose acetate, fiberglass and the like. These may be in many forms of knit and woven fabrics including sateen, poplin, broadcloth, jean cloth gabardine, upholstery materials as well as nonwoven fabrics and the like used to fabricate rainwear, work clothing, suiting, female apparel, tenting, autobody tops, furniture upholstery, draperies and a variety of others.

The following examples are intended to be merely illustrative of the invention and not in limitation thereof. Unless otherwise indicated, all quantities are by weight.

The monomers $R_fCH_2CH_2O_2CCH=CH_2$ were prepared as in Example II of Fasick and Raynolds, U.S. Pat. 3,282,905, except that ethyl acrylate was used in place of methyl methacrylate.

EXAMPLE 1

An aqueous dispersion was prepared from 16 parts of a 50% solution of octadecyltrimethyl ammonium chloride, 144 parts $R_fCH_2CH_2O_2CCH=CH_2$ where $R_f$ was a mixture of perfluoroalkyl groups $R_f(CF_2)_n$— wherein $n$ was 6, 8, 10, 12 and 14 in the ratio 35/30/18/8/3 and 80 parts water. The dispersion was diluted with 48 parts water and purged for 30 min. with nitrogen, 0.095 part 2-hydroxyethyl methacrylate and 0.145 part of 60% aqueous N-methylolacrylamide were added and purging was continued for 30 minutes. Sixteen parts of 2,2,2-trifluoroethyl acrylate were added and the resulting dispersion was then diluted with an additional 75 parts water and heated to 65° C. under a nitrogen atmosphere. Next, 0.32 part azobis(isobutyramidine dihydrochloride) was added and the resulting mixture was maintained at 65–70° C. for 8 hours.

Analysis of the dry polymer indicated that the monomers entered the polymer in about the same ratio as present in the reaction mixture, i.e. about 90%

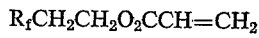

10% $CF_3CH_2O_2CCH=CH_2$ and 0.25% each of

and $CH_2=CHCONHCH_2OH$. The polymer had an inherent viscosity as an 0.5% solution in trichlorotrifluoroethane at 30° C. of 0.245.

EXAMPLE 2

The procedure of Example 1 was repeated substituting 16 parts 2,2,3,3,3-pentafluoropropyl acrylate for 16 parts trifluoroethyl acrylate. The resulting polymer contained about 90% $R_fCH_2CH_2O_2CCH=CH_2$, 10%

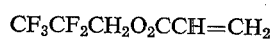

and 0.25% each of $HOCH_2CH_2O_2CC(CH_3)=CH_2$ and $CH_2=CHCONHCH_2OH$ and had an inherent viscosity as an 0.5% solution in trichlorotrifluoroethane at 30° C. of 0.305.

EXAMPLE 3

The procedure of Example 1 was repeated substituting 152 parts $R_fCH_2CH_2O_2CCH=CH_2$ for 144 parts of the same monomer and 8 parts $H(CF_2)_2CH_2O_2CCH=CH_2$ for 16 parts trifluoroethyl acrylate. The resulting polymer contained about 95% $R_fCH_2CH_2O_2CCH=CH_2$, 5%

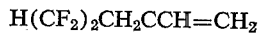

0.25% of each of $HOCH_2CH_2O_2CC(CH_3)=CH_2$ and $CH_2=CHCONHCH_2OH$ and had an inherent viscosity as an 0.5% solution in trichlorotrifluoroethane at 30° C. of 0.360.

EXAMPLE 4

The procedure of Example 1 was repeated using $R_fCH_2CH_2O_2CCH=CH_2$ and 16 parts

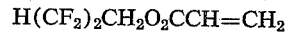

The resulting polymer contained about 90%

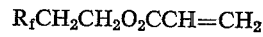

10% $H(CF_2)_2CH_2O_2CCH=CH_2$, and 0.25% of each of $CH_2=C(CH_3)CO_2CH_2CH_2OH$ and $CH_2=CHCONHCH_2OH$ and had an inherent viscosity as an 0.5% solution in trichlorotrifluoroethane at 30° C. of 0.340.

EXAMPLE 5

The procedure of Example 1 was repeated using 128 parts $R_fCH_2CH_2O_2CCH=CH_2$ and 32 parts $$H(CF_2)_2CH_2O_2CCH=CH_2$$

The resulting polymer contained about 80%

$$R_fCH_2O_2CCH=CH_2$$

20% $H(CF_2)_2CH_2O_2CCH=CH_2$ and 0.25% of each of $CH_2=C(CH_3)CO_2CH_2CH_2OH$ and $$CH_2=CHCONHCH_2OH$$

and had an inherent viscosity as an 0.5% solution in trichlorotrifluoroethane at 30° C. of 0.335.

EXAMPLE 6

The procedure of Example 1 was repeated using 152 parts $R_fCH_2CH_2O_2CC(CH_3)=CH_2$, and 8 parts $$(CF_3)_2CHO_2CCH=CH_2$$

The resulting polymer contained about 95%

$$R_fCH_2CH_2O_2CCH=CH_2$$

5% $(CF_3)_2CHO_2CCH=CH_2$ and 0.25% of each of $$CH_2=C(CH_3)CO_2CH_2CH_2OH$$

and $CH_2=CHCONHCH_2OH$ and had an inherent viscosity as an 0.5% solution in trichlorotrifluoroethane at 30° C. of 0.465.

EXAMPLE 7

The procedure of Example 1 was repeated using 152 parts $R_fCH_2CH_2O_2CCH=CH_2$ and 8 parts trifluoroethyl acrylate. The resulting polymer contained about 95%

$$R_fCH_2CH_2O_2CCH=CH_2$$

5% $CF_3CH_2O_2CCH=CH_2$, 0.25% each of $$HOCH_2CH_2O_2CC(CH_3)=CH_2$$

and $CH_2=CHCONHCH_2OH$ and had an inherent viscosity as an 0.5% solution in trichlorotrifluoroethane at 30° C. of 0.270.

EXAMPLE 8

The procedure of Example 1 was repeated using 128 parts $R_fCH_2CH_2O_2CCH=CH_2$ and 32 parts trifluoroethyl acrylate. The resulting polymer containing about 80% $R_fCH_2CH_2O_2CCH=CH_2$, 20% $CF_3CH_2O_2CCH=CH_2$, 0.25% of each of $HOCH_2CH_2O_2CC(CH_3)=CH_2$, and $CH_2=CHONHCH_2OH$ and had an inherent viscosity as an 0.5% solution in trichlorotrifluoroethane at 30° C. of 0.56.

EXAMPLE 9

The procedure of Example 1 was repeated using 152 parts $R_fCH_2CH_2O_2CCH=CH_2$ and 8 parts $$CF_3CF_2CH_2O_2CCH=CH_2$$

The resulting polymer contained about 95%

$$R_fCH_2CH_2O_2CCH=CH_2$$

5% $CF_3CF_2CH_2O_2CCH=CH_2$, 0.25% of each of $$HOCH_2CH_2O_2CC(CH_3)=CH_2$$

and $CH_2=CHCONHCH_2OH$ and had an inherent viscosity as an 0.5% solution in trichlorotrifluoroethane at 30° C. of 27.

EXAMPLE 10

The procedure of Example 1 was repeated using 160 parts $R_fCH_2CH_2O_2CCH=CH_2$, 0.095 part $$HOCH_2CH_2O_2CCH=CH_2$$

and 0.145 part 60% aqueous $CH_2=CHCONHCH_2OH$, while omitting the $CF_3CH_2O_2CCH=CH_2$. The resulting polymer, which is not a polymer of this invention but was prepared for purposes of comparison, contained about 99.5% $R_fCH_2CH_2O_2CCH=CH_2$, 0.25% of each of $$CH_2=C(CH_3)CO_2CH_2CH_2OH$$

and $CH_2=CHCONHCH_2OH$ and had an inherent viscosity as an 0.5% solution in trichlorotrifluoroethane at 30° C. of 0.475.

EXAMPLE 11

Aqueous emulsions of the polymers of Examples 1 and 2 were prepared by adding water and contained 6.00% polymer solids (5.4%) A.I.

$$R_fCH_2CH_2O_2CCH=CH_2$$

in polymerized form. These emulsions were then utilized in the preparation of two formulations (labeled A and B below) to be tested for oil and water repellency on poplin fabric.

| Components of formulation | Amount of components of formulation A in percent OWF | Amount of components of formulation B, percent OWF |
|---|---|---|
| (1) Example 1 polymer emulsion | (¹) | 0 |
| (2) Example 2 polymer emulsion | 0 | (¹) |
| (3) "Permafresh" 183 | 12.0 | 12.0 |
| (4) Catalyst | 2.3 | 2.3 |
| (5) Stabilizer | 0.05 | 0.05 |

¹ 2 and 3 of the polymer.

NOTE.—OWF=On weight of fabric:
1. Example 1 polymer—90% $R_fCH_2CH_2O_2CCH=CH_2$, 10% $CF_3CF_2CH_2O_2CCH=CH_2$, and 0.25% each of $HOCH_2CH_2O_2CC(CH_3)=CH_2$ and $CH_2=CHCONHCH_2OH$.
2. Example 2 polymer—90% $R_fCH_2CH_2O_2CCH=CH_2$, 10% $CF_3CF_2CH_2O_2CCH=CH_2$ and 0.25% each of $HOCH_2CH_2O_2CC(CH_3)=CH_2$ and $CH_2=CHCONHCH_2OH$.
3. "Permafresh" 183—A crease resistant permanent press type resin determined as being

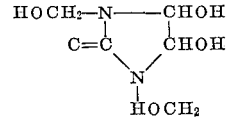

4. Catalyst—27% aqueous zinc nitrate.
5. Stabilizer—30% aqueous hydrochloride salt of

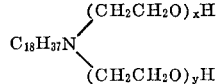

$x + y = 15$

Samples of 65/35 polyethylene terphthalate/cotton-thermosol dyed-poplin fabric were padded with each of the above formulations A and B and wet pickup was controlled to give the OWF concentration shown in the formulations by adjustment of the squeeze rolls (generally about 50% wet pickup). The treated fabrics were then air dried and cured at 340° F. for 10 min. and the resultant oil and water repellency of the fabric was evaluated using the following tests.

The treated fabric samples were tested for water repellency using A.A.T.C.C. Standard Test Method 22–1952 of the American Association of Textile Chemists and Colourists. A rating of 100 denotes no water penetration or surface adhesion, a rating of 90 denotes slight random sticking or wetting and so on.

The oil repellency test comprises placing a drop of test solution carefully on the textile on a flat horizontal surface. After three minutes, any penetration or wicking into the fabric is noted visually. To aid in the observation, the test solutions contained a small amount of oil-soluble blue dye to increase visibility. The nature of the test solutions is shown below; Nujol of course is a purified petroleum oil. Anything with a rating of five or greater is good or excellent, anything with a rating of one or over can be used for certain purposes. As an example, if a treated fabric repels the No. 1–6 solutions but not the number 7 solution, its rating is 6.

| Oil repellency rating: | Test solution | Surface tension, dynes/cm. at 25° C. |
|---|---|---|
| 9 | n-Hexane | 19.2 |
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.4 |
| 3 | n-Hexadecane | 27.3 |
| 2 | 50-50 hexadecane, "Nujol" | 28.7 |
| 1 | "Nujol" | 31.2 |

The results are

|  | Formulation A | | Formulation B | |
|---|---|---|---|---|
|  | Oil | Water | Oil | Water |
| Percent polymer emulsion OWF: | | | | |
| 2.0 | 5 | 70 | 5 | 70 |
| 3.0 | 5 | 70 | 6 | 70 |

EXAMPLE 12

After the testing of Example 11 above, samples of the same treated fabric were subjected to home washing and dry cleaning as described below.

Howe Washing (HW)—A Kenmore washer Model 600 was loaded with a 4-lb. load, with 29 g. of Tide. The wash was set at hot (12 min. cycle) and a warm rinse (12 min.). The total washing and rinsing time was 40 minutes. In the home washing air dry test (HWAD), the spun dry fabrics are dried at ambient temperatures. In the home washing tumble-dry test (HWTD), the spun dry fabrics are dried at 156°–160° F. in a home drier with tumbling.

Dry-Cleaning (DC)—The dry-cleaning consisted of agitating the sample for 120 minutes in tetrachloroethylene containing 1.5% (weight/volume) of a commercial dry-cleaning detergent (R. R. Street Co., 886 Detergent), extraction with tetrachloroethylene, drying for three minutes at 66° C. in a drum followed by a 15 second pressing at 149° C. on each side of the fabric.

The samples were then tested as in Example 11 and the results are shown in Table I below.

TABLE I

| | Oil and water repellencies | | | | | | | |
|---|---|---|---|---|---|---|---|---|
| | Formulation A | | | | Formulation B | | | |
| | Polymer emulsion 2% OWF | | Polymer emulsion 3% OWF | | Polymer emulsion 2% OWF | | Polymer emulsion 3% OWF | |
| Number and type of cleaning and drying procedures | Oil | Water | Oil | Water | Oil | Water | Oil | Water |
| 1 HWAD | 2 | 70 | 2 | 70 | 2 | 70 | 4 | 70 |
| 5 HW-1 AD [1] | 2 | 70 | ([2]) | ([2]) | 2 | 70 | ([2]) | ([2]) |
| 1 HWTD | 3 | 70 | 4 | 70 | 3 | 70 | 5 | 70 |
| 5 HW-5 TD | 2 | 70 | ([2]) | ([2]) | 2 | 70 | ([2]) | ([2]) |
| 10 HW-10 TD | 2 | 70 | ([2]) | ([2]) | 2 | 70 | ([2]) | ([2]) |
| 20 HW-20 TD | 2 | 70 | ([2]) | ([2]) | 2 | 70 | ([2]) | ([2]) |
| 1 DC | 3 | 70 | 5 | 70 | 4 | 70 | 6 | 70 |
| 10 DC | 4 | 70 | ([2]) | ([2]) | 4 | 70 | ([2]) | ([2]) |
| 20 DC | 1 | 70 | ([2]) | ([2]) | 1 | 70 | ([2]) | ([2]) |

[1] 1 AD after last HW.
[2] Test not run.

EXAMPLE 13

Samples of the fabric treated with formulations A and B as in Example 11 were withdrawn prior to curing, and were instead placed in an oven at 275° F. for set periods of time and subsequently evaluated for oil repellency. Fabrics in the oven less than 40 sec. were still wet, but in all cases fabrics removed from the oven were air dried in a constant humidity atmosphere before oil repellency was determined. The results are shown in Table II.

TABLE II

|  | Formulation A [1] | Formulation B [1] |
|---|---|---|
| Seconds in oven: | | |
| 10 | 1 | 1 |
| 20 | 2 | 2 |
| 40 | 2 | 3 |
| 80 | 4 | 3 |
| 160 | 4 | 3 |
| 300 | 4 | 3 |

[1] Polymer emulsion 2% OWF, oil repellency.

It should be noted that these are permanent press treatments prior to curing of the permanent press resin. Such curing usually occurs at 300–350° F. for 10 min. and therefore the 275° F. oven heating does not "cure" the permanent press resin. It can therefore be seen from these results in Table II that even when not completely dry, some oil repellency exists and after drying there is increased repellency thus protecting the fabric without curing the permanent press resin.

EXAMPLE 14

Samples of the fabrics treated with formulations A and B and cured as in Example 11 were subjected to the dry-cleaning procedure, omitting the drying and pressing steps. After removal of excess solvent, the fabrics were placed in a flat-bed press for a specified number of seconds on each side of the fabric and then tested for oil repellency. The results are shown in Table III.

TABLE III

|  | Oil repellency | |
|---|---|---|
|  | Formulation A [1] | Formulation B [1] |
| Seconds in press: | | |
| 0 | 4 | 4 |
| 5 | 4 | 4 |
| 10 | 4 | 4 |
| 15 | 4 | 4 |

[1] Polymer emulsion 2% OWF.

The fabrics thus have repellency without reheating.

While repellency is normally lost from permanent press fabrics as a result of dry cleaning and reheating is required to regain repellency this is not the case when copolymers of the instant invention are used. It is can be seen from the results in Table III that the treated fabrics retained repellency without need for reheating.

EXAMPLE 15

Samples of fabric treated with formulations A and B, were cured and dry cleaned once according to the procedure of Example 11. The samples were then subjected to a varying number of cycles of a Wyco abrader and evaluated for oil repellency. The results are shown in Table IV.

TABLE IV

| No. abrasion cycles in Wyco abrader: | Formulation A[1] | Formulation B[1] |
|---|---|---|
| 0 | 7 | 6 |
| 500 | 6 | 6 |
| 1,000 | | 6 |
| 1,500 | 6 | 5 |
| 3,000 | 3 | |
| 5,000 | 3 | 4 |

[1] Polymer emulsion 2% OWF, oil repellency.

Good resistance to abrasion is evidenced by the results in Table IV.

EXAMPLE 16

Polymer emulsions of the polymers of Examples 3 to 10 were prepared as in Example 11 and were diluted to contain 5.4% A.I. of $R_fCH_2CH_2O_2CCH=CH_2$ in polymerized form. These emulsions were then used to prepare 8 formulations the components of which are listed below:

Component—Percent OWF
"Permafresh" 183 [1]—12.0
Catalyst [1]—2.4
Stabilizer [1]—0.05

1 Each of the Polymer Emulsion of Polymers of Examples 3 to 10—2 or 3

[1] Cf. Example 11.

Fabric samples were padded and tested as in Example 11, and the results are shown in Table V.

TABLE V

| | | | Repellencies | | | | | |
|---|---|---|---|---|---|---|---|---|
| Polymer emulsion of— | Initial Percent OWF | Oil | Water | 1 HWAD Oil | Water | 1 HWTD Oil | Water | Oil | 1 DC Water |

| Polymer emulsion of— | Initial Percent OWF | Oil | Water | 1 HWAD Oil | 1 HWAD Water | 1 HWTD Oil | 1 HWTD Water | 1 DC Oil | 1 DC Water |
|---|---|---|---|---|---|---|---|---|---|
| Polymer Ex. 3 [1] | 2 | 5 | 70 | 2 | 50 | 3 | 50 | 3 | 50 |
| | 3 | 5 | 70 | 2 | 70 | 4 | 70 | 5 | 70 |
| Polymer Ex. 4 [2] | 2 | 5 | 70 | 2 | 50 | 3 | 50 | 4 | 50 |
| | 3 | 6 | 70 | 2 | 70 | 4 | 70 | 6 | 50 |
| Polymer Ex. 5 [3] | 2 | 5 | 70 | 3 | 50 | 3 | 70 | 5 | 50 |
| | 3 | 6 | 70 | 4 | 70 | 5 | 70 | 5 | 50 |
| Polymer Ex. 6 [4] | 2 | 4 | 70 | 2 | 50 | 2 | 70 | 3 | 50 |
| | 3 | 5 | 70 | 2 | 50 | 3 | 70 | 4 | 70 |
| Polymer Ex. 7 [5] | 2 | 4 | 50 | 2 | 50 | 3 | 50 | 3 | 70 |
| | 3 | 6 | 80 | 2 | 70 | 4 | 70 | 5 | 70 |
| Polymer Ex. 8 [6] | 3 | 4 | 70 | 3 | 50 | 4 | 70 | 4 | 50 |
| Polymer Ex. 9 [7] | 2 | 4 | 70 | 1 | 50 | 2 | 50 | 2 | 50 |
| | 3 | 5 | 70 | 2 | 50 | 3 | 70 | 5 | 50 |
| Polymer Ex. 10 [8] | 2 | 4 | 70 | 1 | 50 | 2 | 70 | 3 | 50 |
| | 3 | 5 | 80 | 2 | 50 | 3 | 70 | 4 | 50 |

[1] 95% $R_fCH_2CH_2O_2CCH=CH_2$, 5% $H(CF_2)_2CH_2O_2CCH=CH_2$, 0.25% of each of $HOCH_2CH_2CH_2O_2-CC(CH_3)=CH_2$ and $CH_2=CHCONHCH_2ON$.

[2] 90% $R_fCH_2CH_2O_2CCH=CH_2$ 10% $H(CF_2)_2CH_2O_2CCH=CH_2$, 0.25% of each of $CH_2=C(CH_3)-CO_2CH_2CH_2OH$ and $CH_2=CHCONHCH_2OH$.

[3] 80% $R_fCH_2CH_2O_2CCH=CH_2$, 20% $H(CF_2)_2CH_2O_2CCH=CH_2$ and 0.25% of each of $CH_2=C(CH_3)-CO_2CH_2CH_2OH$ and $CH_2=CHCONHCH_2OH$.

[4] 95% $R_fCH_2CH_2O_2CCH=CH_2$, 5% $(CF_3)_2CHO_2CCH=CH_2$ and 0.25% of each of $CH_2=C(CH_3)CO_2CH_2CH_2OH$ and $CH_2=CH-CONHCH_2OH$.

[5] 95% $R_fCH_2CH_2O_2CCH=CH_2$, 5% $CF_3CH_2O_2CCH=CH_2$, 0.25% each of $HOCH_2-CH_2O_2CC(CH_3)=CH_2$ and $CH_2=CHCONH-CH_2OH$.

[6] 80% $R_fCH_2CH_2O_2CCH=CH_2$, 20% $CF_3CH_2O_2CCH=CH_2$, 0.25% of each of $HOCH_2-CH_2O_2CC(CH_3)=CH_2$ and $CH_2=CHCONHCHO_2OH$.

[7] 95% $R_fCH_2CH_2O_2CCH=CH_2$, 5% $CF_3CF_2CH_2O_2CCH=CH_2$, 0.25% of each of $HOCH_2CH_2O_2CC(CH_3)=CH_2$ and $CH_2=CHCONHCH_2OH$.

[8] 99.5% $R_fCH_2CH_2O_2CCH=CH_2$, 0.25% of each of $CH_2=C(CH_3)CO_2CH_2CH_2OH$ and $CH_2=CHCONHCH_2OH$.

EXAMPLE 17

Pad baths were prepared with the formulations shown below. Textiles were padded with these baths and the wet pickup was controlled to give the concentrations on fabric shown by adjustment of the squeeze rolls. The treated fabrics were then placed in an oven heated at 275° F. for specific times and the indicated repellencies were determined. Fabrics in the oven 40 sec. or less were still wet. In all cases, the fabrics were air dried in a constant humidity room until constant weight is reached before the repellency was determined. The results are shown in Table VI.

FORMULATIONS

| Component | Percent OWF | | | |
|---|---|---|---|---|
| | A | B | C | D |
| Dispersion of 6.21% A.I. fluoropolymer of Example 1 | 2.5 | 3.5 | | |
| Dispersion of 6.21% A.I. fluoropolymer of Example 10 | | | 2.5 | 3.5 |
| "Permafresh" 183 of Example 11 | 12.0 | 12.0 | 12.0 | 12.0 |
| Catalyst of Example 11 | 2.3 | 2.3 | 2.3 | 2.3 |
| Stabilizer of Example 11 | 0.04 | 0.04 | 0.04 | 0.04 |

The fabrics treated were:

Fabric A—65/35 polyester/cotton described in Example 11.

Fabric B—undyed, mercerized cotton, neutral pH, no whiteners, 1.6 yds./lb., 46 inches wide.

The results are shown below. In these tests, two oil repellency tests were used; "30 sec." refers to test method No. 118-1966T as written; "3 min." refers to th 3 minute variation using blue dyed oils described in Example 11. Water repellency was determined using test method No. 22-1952 described in Example 11.

TABLE VI

| Time in oven, sec. | Formulation | Oil repellency | |
|---|---|---|---|
| | | 30 sec. | 3 min. |
| Fabric A: | | | |
| 10 | A | 3 | 3 |
| 20 | A | 4 | 3 |
| 40 | A | 4 | 4 |
| 60 | A | | 4 |
| 10 | B | 5 | 4 |
| 20 | B | 5 | 4 |
| 40 | B | 5 | 5 |
| 10 | C | 2 | 2 |
| 20 | C | 2 | 2 |
| 40 | C | 4 | 3 |
| 60 | C | | 4 |
| 10 | D | 3 | 3 |
| 20 | D | 3 | 2 |
| 40 | D | 6 | 5 |

| | | Water repellency |
|---|---|---|
| Fabric B: | | |
| 10 | B | 50 |
| 20 | B | 50 |
| 40 | B | 50 |
| 60 | B | 50 |
| 80 | B | 70 |
| 10 | D | 0 |
| 20 | D | 0 |
| 40 | D | 50 |
| 60 | D | 50 |
| 80 | D | 70 |

It can be seen from Table VI that fabrics treated with the copolymers of this invention i.e., Formulations A and B, in general possess superior properties of oil and water repellency when compared with fabrics treated with polymers outside the scope of this invention i.e., Formulations C and D. Further, the total data contained herein clearly demonstrate the superior oil and water repellency of fabrics treated with the polymers of this invention even after the fabric is subjected to excessive abrasion.

The foregoing detaild dscription has been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed are defined as follows:

1. An oil and water repellent polymer consisting essentially of
   (a) from about 75 to 98 weight percent of units derived from monomers having the structure $$R_fCH_2CH_2O_2CCH=CH_2$$

where $R_f$ is a perfluoroalkyl group of 4 to 14 carbon atoms.
   (b) from about 25 to 2 weight percent of units derived from monomers having the structure $$RO_2CCH=CH_2$$

where R is selected from $F(CF_2)_n$—$CH_2$— wherein $n$ is the integer 1 or 2, $HCF_2$—$CF_2CH_2$—, and $(CF_3)_2CH$; and
   (c) from about 0 to 5 weight percent of units derived from monomers selected from
   $CH_2=CR^1CONH$—$R^2OH$,
   $CH_2=CR^1CO_2R^3OH$,
   $CH_2=CRCO_2R^4$, and mixtures thereof,
   wherein $R^1$ is H or $CH_3$, $R^2$ is an alkylene group of about $C_{1-4}$, $R^3$ is an alkylene group of about $C_{2-4}$ and $R^4$ is an epoxyalkyl group of about $C_{3-4}$; and wherein the total weight of units present in the copolymer is 100 percent.

2. A polymer according to claim 1 wherein $R_f$ in the units defined in part (a) of claim 1 has the formula $F(CF_2)_s$ wherein $s$ is 4 to 14.

3. A polymer according to claim 2 wherein $s$ in the formula $F(CF_2)_s$ has the numerical values 6, 8, 10, 12 and 14 present ina weight ratio of 35/30/18/8/3.

4. A polymer according to claim 1 wherein R in the units defined in part (b) of claim 1 has the formula $F(CF_2)_nCH_2$— wherein $n$ is the integer 1 or 2.

5. A polymer according to claim 4 wherein R is $CF_3CH_2$—.

6. A polymer according to claim 4 wherein R is $CF_3CF_2CH_2$—.

7. A polymer according to claim 1 wherein R is in the units defined in part (b) of claim 1 has the formula $HCF_2CF_2CH_2$—.

8. A polymer according to claim 1 wherein R in the units defined in part (b) of claim 1 has the formula $(CF_3)_2CH$—.

9. A polymer according to claim 1 wherein about 10 to 3 weight percent of units derived from the monomer having the structure $RO_2CCH=CH_2$ is present.

10. A polymer according to claim 1 wherein the inherent viscosity of said copolymer as a 0.5% solutions in trichlorotrifluoroethane at 30° C. be less than 0.8.

11. A polymer according to claim 10 wherein the inherent viscosity is from about 0.1 to 0.35.

12. A polymer according to claim 3 wherein R in the units defined in part (b) of claim 1 has the formula $F(CF_2)_nCH_2$— wherein $n$ is the integer 1 or 2.

13. A polymer according to claim 12 wherein R is $CF_3CH_2$—.

14. A polymer according to claim 12 wherein R is $CF_3CF_2CH_2$—.

15. A polymer according to claim 3 wherein R in the units defined in part (b) of claim 1 has the formula $HCF_2CF_2CH_2$—.

16. A polymer according to claim 3 wherein R in the units defined in part (b) of claim 1 has the formula $(CF_3)_2CH$—.

17. A polymer according to claim 3 wherein about 10 to 3 weight percent of units derived from the monomer having the structure $RO_2CCH=CH_2$ is present.

18. A polymer according to claim 3 wherein the inherent viscosity of said copolymer as a 0.5% solutions in trichlorotrifluoroethane at 30° C. be less than 0.8.

19. A polymer according to claim 18 wherein the inherent viscosity is from about 0.1 to 0.35.

20. A textile fabric treated with a polymer of claim 1.

21. A textile fabric treated with a polymer of claim 3.

References Cited
UNITED STATES PATENTS

| | | | |
|---|---|---|---|
| 2,991,277 | 7/1961 | Schildknecht | 260—86.1 |
| 3,102,103 | 8/1963 | Ahlbrecht et al. | 260—86.1 |
| 3,282,905 | 11/1966 | Fasick et al. | 260—86.1 |
| 3,347,812 | 10/1967 | De Marco et al. | 260—86.1 |
| 3,378,609 | 4/1968 | Fasick et al. | 260—86.1 |
| 3,384,627 | 5/1968 | Anello et al. | 260—86.1 |
| 3,459,696 | 8/1969 | Read | 260—86.1 |

HARRY WONG, JR., Primary Examiner

U.S. Cl. X.R.

117—121, 138.8, 139.5, 140, 145, 161; 260—29.6, 45.9, 80.72, 80.73, 86.1, 486

PO-1050
(5/69)

UNITED STATES PATENT OFFICE
CERTIFICATE OF CORRECTION

Patent No. 3,547,856          Dated  December 15, 1970

Inventor(s)  Thomas K. Tandy, Jr.

It is certified that error appears in the above-identified patent
and that said Letters Patent are hereby corrected as shown below:

The third formula of Claim 1(c) should appear as follows:
$CH_2=CR^1CO_2R^4$

SIGNED AND
SEALED
MAR 9 1971

(SEAL)
Attest:

Edward M. Fletcher, Jr.
Attesting Officer

WILLIAM E. SCHUYLER, JR.
Commissioner of Patents